Patented Nov. 19, 1940

2,221,911

UNITED STATES PATENT OFFICE 2,221,911

AZO COMPOUNDS AND MATERIAL COLORED THEREWITH

Joseph B. Dickey, Rochester, N. Y., assignor to Eastman Kodak Company, Rochester, N. Y., a corporation of New Jersey No Drawing. Application July 1, 1939, Serial No. 282,530

9 Claims. (Cl. 260—206)

This invention relates to azo dyes and to textile materials colored therewith. More particularly it relates to azo compounds having the general formula:

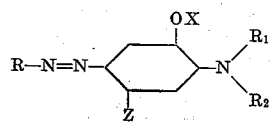

wherein R represents a member selected from the group consisting of a benzene nucleus, a naphthalene nucleus, an azobenzene nucleus, and a heterocyclic nucleus, $R_1$ and $R_2$ each represent a member selected from the group consisting of hydrogen, an alkyl group, a hydroxyalkyl group, a polyhydroxyalkyl group, an alkoxyalkyl group, an acyloxyalkyl group, a sulfatoalkyl group and a sulfoalkyl group, X represents a member selected from the group consisting of a monohydroxyalkyl group, a polyhydroxyalkyl group, a hydroxycycloalkyl group, an alkoxyalkyl group, a hydroxyalkoxyalkyl group, sulfoalkyl group, and a sulfatoalkyl group, and Z represents a member selected from the group consisting of halogen, and an alkyl group.

It should be noted that while the invention is primarily concerned with the monoazo compounds polyazo compounds are likewise included within the scope of my invention as will be more fully apparent hereinafter. R in the above general formula, for example, may be an aromatic component containing an azo bond such as an azo benzene nucleus.

It is an object, therefore, of my invention to prepare the class of dyestuffs above described and to color organic derivatives of cellulose, particularly cellulose acetate in the form of threads, yarns, filaments, and fabric materials therewith.

The azo compounds of the invention may be prepared by coupling the diazo salts of various suitable arylamines belonging to the benzene and naphthalene series and the diazo salts of suitable heterocyclic amino compounds with aniline derivatives having the general formula:

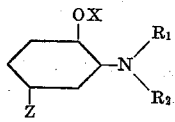

wherein $R_1$, $R_2$, X, and Z have the same meaning as previously defined. The above type of aniline intermediates may be obtained by a number of methods including the processes illustrated diagrammatically below. In Process A, the starting material 2,5-dichloro-nitrobenzene (I) is condensed with a sodium alkylate having the general formula NaOX to form the alkoxy derivatives (II) which may be reduced to the corresponding amino compounds (III), and the latter may then be converted by alkylation and/or arylation of the amino groups to the desired intermediates (IV)

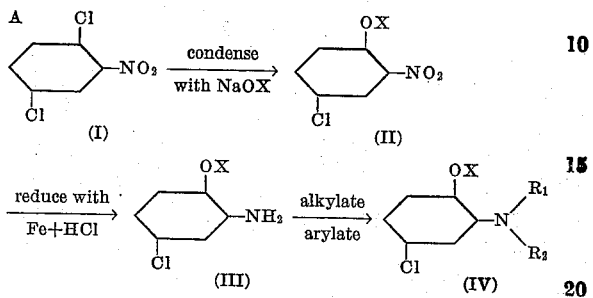

wherein $R_1$, $R_2$, and X have the meanings already defined.

In Process B, the starting material which may be a 4-halo-2-nitro-sodium phenylate or a 4-alkyl-2-nitro-sodium phenylate (I) is condensed with a compound having the general formula Cl—X to form the alkoxy derivatives (II) which may be reduced to the corresponding amino compounds (III), and the latter may then be converted by alkylation and/or arylation of the amino groups to the desired intermediates (IV)

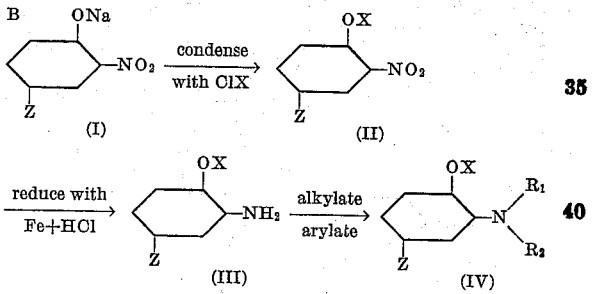

wherein $R_1$, $R_2$, X, and Z have the same meanings as above defined.

The following examples illustrate the preparation of the azo compounds of my invention.

Example 1

13.8 grams of p-nitroaniline are suspended in 200 c.cs. of water containing 40 c.cs. of hydrochloric acid, and diazotized at 10–20° C. with 6.9 grams of sodium nitrite. 16.7 grams of 2-β-hydroxyethoxy-5-methylaniline are dissolved in cold dilute hydrochloric acid and the diazo solution added. Coupling is completed by neutralizing with sodium acetate, after which the dye is filtered off, washed and dried. Cellulose acetate is colored rubine shades from aqueous suspensions of the dye.

The azo compound thus obtained has the formula:

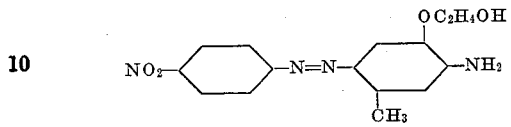

*Example 2*

17.3 grams of p-nitro-o-chloroaniline are diazotized and coupled with 22.5 grams of 2-β (or γ)-hydroxy propoxy-5-methyl - β - hydroxyethyl aniline following the procedure described in Example 1. Cellulose acetate is colored wine shades from aqueous suspensions of the dye.

The azo compound thus obtained has the formula:

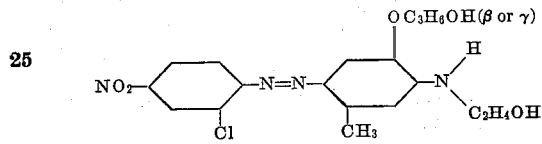

*Example 3*

21.7 grams of p-nitro-o-bromoaniline are diazotized and coupled with 40.4 grams of 2-p-hydroxycyclohexoxy-5-methyl-butyl sodium sulfoethyl aniline following the procedure described in Example 1. Cellulose acetate is colored wine shades from aqueous suspensions of the dye.

The azo compound thus obtained has the formula:

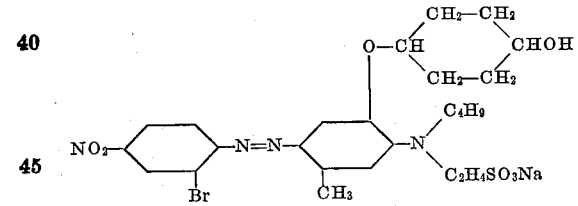

*Example 4*

21.6 grams of 2-amino-5-nitro phenyl methylsulfone are diazotized and coupled with 36.5 grams of 2-β-sodium sulfoethoxy-5-methyl-dibutylaniline following the procedure described in Example 1. Cellulose acetate is colored violet shades from aqueous suspensions of the dye.

The azo compound prepared as above described has the formula:

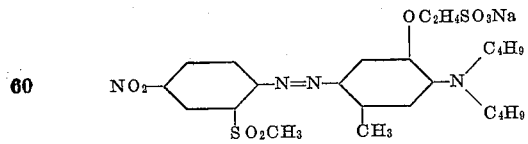

*Example 5*

13.8 grams of p-nitroaniline are suspended in 200 c.cs. of water containing 40 c.cs. of hydrochloric acid and diazotized at 10-20° C. with 6.9 grams of sodium nitrite. This solution is then added to 18.8 grams of 2-β-hydroxyethoxy-5-chloroaniline dissolved in cold dilute hydrochloric acid, and the coupling reaction completed by neutralizing with sodium acetate, after which the dye is filtered off, washed and dried. Cellulose acetate is colored rubine shades from aqueous suspensions of the dye.

The azo compound obtained as above has the formula:

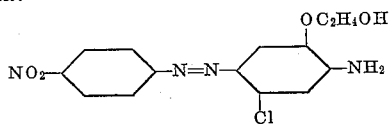

*Example 6*

13.5 grams of p-amino acetophenone are dissolved in 150 c.cs. of water containing 25 c.cs. of hydrochloric acid, ice added, and the amine diazotized with 6.9 grams of sodium nitrite. 23.2 grams of 2-glyceryloxy-5-chloromethylaniline are dissolved in cold dilute hydrochloric acid, the diazo solution slowly added, and the coupling reaction completed by neutralizing with sodium acetate, after which the dye is filtered off, washed and dried. Cellulose acetate is colored orange shades from aqueous suspensions of the dye.

The azo compound thus obtained has the formula:

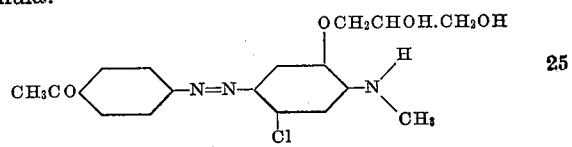

*Example 7*

12.8 grams of o-chloroaniline are diazotized and coupled with 24.6 grams of 2-β-ethoxy ethoxy-5-chloro-dimethylaniline following the procedure described in Example 6. Cellulose acetate is colored yellow shades from aqueous suspensions of the dye.

The azo compound thus obtained has the formula:

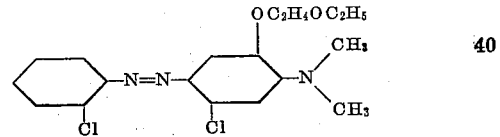

*Example 8*

(A) 7.6 grams of sodium nitrite are dissolved in 53 c.cs. of concentrated sulphuric acid, the solution warmed to 70° C., and then cooled to 10-15° C.

(B) 22.8 grams of 2,4,6-trinitroaniline are dissolved in 220 c.cs. of hot acetic acid, and the solution rapidly cooled to room temperature.

The diazotization is accomplished by slowly stirring solution (B) into solution (A) over a period of 30 minutes, meanwhile maintaining a temperature of 10-15° C. After the addition is complete, the mixture is stirred at room temperature for 1 hour, and then 1 gram of urea is added.

The diazo mixture prepared as above is then slowly added to a solution of 29.0 grams of 2-β-methoxyethoxy-5- chloro-di-hydroxyethylaniline dissolved in cold dilute hydrochloric acid. The coupling reaction is completed by neutralizing with sodium acetate, after which the dye is filtered off, washed and dried. Cellulose acetate is colored blue shades from aqueous suspensions of the dye.

The azo compound obtained by the procedure above described has the formula:

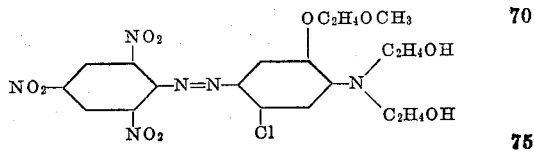

Example 9

31.5 grams of 4-nitrophenyl-azo-2-methyl-5-β-hydroxyethoxy-4-aminobenzene are suspended in 500 c.cs. of water with 40 c.cs. of hydrochloric acid and diazotized with 6.9 grams of sodium nitrite at 15–20° C. 22.7 grams of 1-β-hydroxyethylamino-5-naphthol are dissolved in cold dilute hydrochloric acid and the diazo solution slowly added. The coupling reaction is completed by neutralizing with sodium acetate, and the dye is filtered off, washed and dried. Cellulose acetate is colored red-blue shades from aqueous suspensions of the dye.

The polyazo compound thus prepared has the formula:

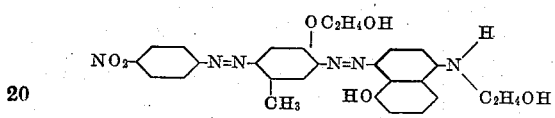

In place of 1-β-hydroxyethylamino-5-naphthol there may be substituted other suitable coupling components such as m-toluidine, ethyl-m-toluidine, dimethyl-m-toluidine, β-hydroxyethyl-m-toluidine, glyceryl-m-toluidine, aniline, di-β-hydroxyethyl aniline, di-β-methoxyethylaniline, cresidine, ethyl cresidine, β-hydroxyethyl cresidine, glyceryl cresidine, 5,5-dimethyl-cyclohexandione-1,3-barbituric acid, 1-phenyl-3-methyl-5-pyrazolone and similar type of compounds capable of being coupled.

Example 10

18.0 grams of 6-methoxy-2-aminobenzothiazole are dissolved in a warmed mixture of 55 c.cs. of water and 17 c.cs. of formic acid. The solution is cooled and then added to a cold mixture of 50 c.cs. of water and 110 grams of sulphuric acid, and the amine diazotized at −5° C. with 6.9 grams of sodium nitrite. The diazo solution prepared as above is added to an iced aqueous solution containing 32.7 grams of 2-ammonium sulfatoethoxy-5-chloromethyl ethylaniline. The coupling reaction is completed by neutralizing with sodium acetate, after which the dye is filtered off, washed and dried. Cellulose acetate is colored rubine shades from aqueous suspensions of the dye.

The azo compound thus obtained has the formula:

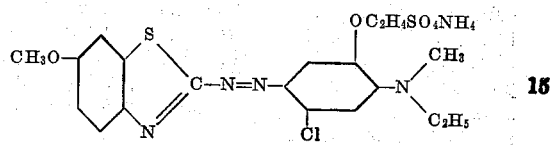

The invention is further illustrated by reference to the following table wherein the compound listed under the heading "Amine" is diazotized and coupled with an equivalent amount of the compound appearing in opposite position in the column entitled, "Coupling Component," the dye resulting therefrom coloring cellulose acetate silk the shades designated.

| Amine | Coupling component | Shade on cellulose acetate |
|---|---|---|
| o-Chloroaniline | 1. 2-β-hydroxyethoxy-5-methyl aniline | Yellow. |
|  | 2. 2-β-hydroxyethoxy-5-chloro aniline | Do. |
|  | 3. 2-β-hydroxyethoxy-5-methyl-ethyl-aniline | Do. |
|  | 4. 2-β-hydroxyethoxy-5-bromo-ethyl-aniline | Do. |
|  | 5. 2-β-hydroxyethoxy-5-ethyl-β-hydroxyethyl ethylaniline | Do. |
|  | 6. 2-β-hydroxyethoxy-5-chloro-β-hydroxyethyl ethylaniline | Do. |
|  | 7. 2-β (or γ)-hydroxypropoxy-5-methyl-di-β-hydroxyethyl aniline | Do. |
|  | 8. 2-β (or γ)-hydroxypropoxy-5-chloro-di-β-hydroxyethylaniline | Do. |
|  | 9. 2-glyceryloxy-5-methyl-methyl ethyl aniline | Do. |
|  | 10. 2-glyceryloxy-5-fluoro-methyl ethyl aniline | Do. |
|  | 11. 2-methoxyethoxy-5-methyl-β-methoxy-ethyl acetoxyethyl aniline | Do. |
|  | 12. 2-glyceryloxy-5-chloro-β-methoxy-ethyl acetoxyethyl aniline | Do. |
|  | 13. 2-β-sodium sulfoethoxy-5-butyl-butyl aniline | Do. |
|  | 14. 2-sodium sulfoethoxy-5-chloro-butyl aniline | Do. |
|  | 15. 2-β-hydroxyethoxyethoxy-5-methyl-ethyl aniline | Do. |
|  | 16. 2-β-hydroxyethoxy ethoxy-5-chloro-aniline | Do. |
|  | 17. 2-β-hydroxyethoxy-5-hydroxy-di-β-hydroxyethylaniline | Do. |
|  | 18. 2-β-hydroxyethoxy-5-chloro-di-β-hydroxyethylaniline | Do. |
|  | 19. 2-β-hydroxyethoxy-5-methyl-glyceryl-aniline | Do. |
|  | 20. 2-β-hydroxyethoxy-5-iodo-glyceryl-aniline | Do. |
|  | 21. 2-β-hydroxyethoxy-5-methyl-ethyl glyceryl aniline | Do. |
|  | 22. 2-β-hydroxyethoxy-5-chloro-sodium sulfatoethyl glycerylaniline | Do. |
|  | 23. 2-β-hydroxyethoxy-5-methyl-n-propylaniline | Do. |
|  | 24. 2-β-hydroxyethoxy-5-chloro-n-propylaniline | Do. |
| 2-chloro-4-methylaniline | Couplers 1–24 | Yellow. |
| 2-methyl-4-chloroaniline | do | Do. |
| 2-methoxy-5-chloroaniline | do | Do. |
| p-Amino acetophenone | do | Orange to red. |
| o-Nitroaniline | do | Red. |
| p-Nitroaniline | do | Rubine. |
| p-Nitro-o-methoxyaniline | do | Do. |
| p-Nitro-o-methylaniline | do | Do. |
| p-Nitro-o-bromoaniline | do | Wine. |
| 2,4-dinitroaniline | do | Purple. |
| 2,4-dinitro-6-chloroaniline | do | Violet. |
| 2,4-dinitro-6-bromoaniline | do | Do. |
| 2,4-dinitro-6-fluoroaniline | do | Do. |
| 2,4,6-trinitroaniline | do | Blue. |
| 2,4-dinitro-α-naphthylamine | do | Violet. |
| 2-amino-6-alkoxybenzothiazole | do | Wine. |
| 2-amino-6-alkoxybenzoxazole | do | Do. |
| p-Amino azo benzene | do | Do. |
| 1-amino-6-ethyl sulfonamide-2,4-dinitrobenzene. | do | Wine-blue. |

The azo dye compounds of my invention are ordinarily applied to the textile material such as an organic derivative of cellulose in the form of an aqueous dispersion. For example, the dye compound is finely ground with a dispersing agent such as a sulfonated oil, a soap, or an oleyl glyceryl sulfate and the resulting paste is dispersed in water. The dispersion thus prepared is heated to a temperature approximating 45–55° C. and the cellulose acetate silk in the form of threads or fabric is immersed in the solution, after which the temperature is gradually raised to 80–85° C., and maintained at this point for several hours. Sodium chloride may be added as desired during the dyeing operation to promote exhaustion of the dye bath. Upon completion of the dyeing operation, the cellulose acetate silk is removed from the bath, washed with soap, rinsed and dried. Where the azo compound of my invention is water-soluble, it may be applied directly from an aqueous solution without the necessity of employing a dispersing or solubilizing agent.

The term "organic derivative of cellulose" is intended to include the hydrolyzed as well as the unhydrolyzed cellulose organic acid esters and cellulose mixed organic acid esters such as cellulose acetate, cellulose formate, cellulose propionate, cellulose butyrate, cellulose acetate-propionate, cellulose acetate-butyrate, and cellulose ethers such as methyl cellulose, ethyl cellulose, and benzyl cellulose.

I claim:

1. The azo compounds having the general formula:

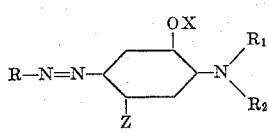

wherein R represents a member selected from the group consisting of a benzene nucleus, a naphthalene nucleus, an azobenzene nucleus, a benzothiazole nucleus, and a benzoxazole nucleus, $R_1$ and $R_2$ each represent a member selected from the group consisting of an alkyl group, a hydroxyalkyl group, a polyhydroxyalkyl group, an alkoxyalkyl group, an acyloxyalkyl group, a sulfatoalkyl group, and a sulfoalkyl group, and in addition $R_1$ may be hydrogen, X represents a member selected from the group consisting of a monohydroxyalkyl group, a polyhydroxyalkyl group, a hydroxycycloalkyl group, an alkoxyalkyl group, and a hydroxyalkoxyalkyl group, and Z represents a member selected from the group consisting of halogen, and an alkyl group.

2. The azo compounds having the general formula:

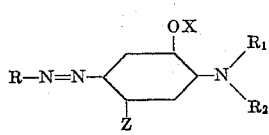

wherein R represents a benzene nucleus, $R_1$ and $R_2$ each represent a member selected from the group consisting of an alkyl group, a hydroxyalkyl group, a polyhydroxyalkyl group, an alkoxyalkyl group, an acyloxyalkyl group, a sulfatoalkyl group, and a sulfoalkyl group, and in addition $R_1$ may be hydrogen, X represents a member selected from the group consisting of a monohydroxyalkyl group, a polyhydroxyalkyl group, a hydroxycycloalkyl group, an alkoxyalkyl group, and a hydroxyalkoxyalkyl group, and Z represents a member selected from the group consisting of halogen, and an alkyl group.

3. The azo compounds having the general formula:

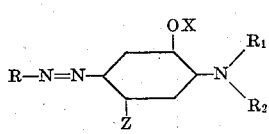

wherein R represents an azobenzene nucleus, $R_1$ and $R_2$ each represent a member selected from the group consisting of an alkyl group, a hydroxyalkyl group, a polyhydroxyalkyl group, an alkoxyalkyl group, an acyloxyalkyl group, a sulfatoalkyl group, and a sulfoalkyl group, and in addition $R_1$ may be hydrogen, X represents a member selected from the group consisting of a monohydroxyalkyl group, a polyhydroxyalkyl group, a hydroxycycloalkyl group, an alkoxyalkyl group, and a hydroxyalkoxyalkyl group, and Z represents a member selected from the group consisting of halogen, and an alkyl group.

4. The azo compounds having the general formula:

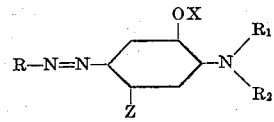

wherein R represents a benzene nucleus, $R_1$ and $R_2$ each represent a member selected from the group consisting of an alkyl group, a hydroxyalkyl group, a polyhydroxyalkyl group, an alkoxyalkyl group, an acyloxyalkyl group, a sulfatoalkyl group, and a sulfoalkyl group, and in addition $R_1$ may be hydrogen, X represents a member selected from the group consisting of a monohydroxyalkyl group, a polyhydroxyalkyl group, a hydroxycycloalkyl group, an alkoxyalkyl group, and a hydroxyalkoxyalkyl group, and Z represents an alkyl group.

5. The azo compounds having the general formula:

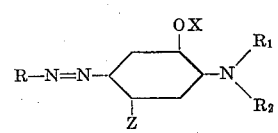

wherein R represents an azobenzene nucleus, $R_1$ and $R_2$ each represent a member selected from the group consisting of an alkyl group, a hydroxyalkyl group, a polyhydroxyalkyl group, an alkoxyalkyl group, an acyloxyalkyl group, a sulfatoalkyl group, and a sulfoalkyl group, and in addition $R_1$ may be hydrogen, X represents a member selected from the group consisting of a monohydroxyalkyl group, a polyhydroxyalkyl group, a hydroxycycloalkyl group, an alkoxyalkyl group, and a hydroxyalkoxyalkyl group, and Z represents an alkyl group.

6. The azo compounds having the general formula:

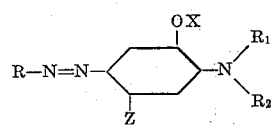

wherein R represents a benzene nucelus, $R_1$ and $R_2$ each represent a member selected from the group consisting of an alkyl group, a hydroxyalkyl group, a polyhydroxyalkyl group, an alkoxyalkyl group, an acyloxyalkyl group, a sulfatoalkyl group, and a sulfoalkyl group, and in addition $R_1$ may be hydrogen, X represents a member selected from the group consisting of a monohydroxyalkyl group, a polyhydroxyalkyl group, a hydroxycycloalkyl group, an alkoxyalkyl group, and a hydroxyalkoxyalkyl group, and Z represents a halogen.

7. The azo compounds having the general formula:

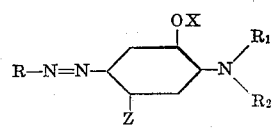

wherein R represents an azobenzene nucleus, $R_1$ and $R_2$ each represent a member selected from the group consisting of an alkyl group, a hydroxyalkyl group, a polyhydroxyalkyl group, an alkoxyalkyl group, an acyloxyalkyl group, a sulfatoalkyl group, and a sulfoalkyl group, and in addition $R_1$ may be hydrogen, X represents a member selected from the group consisting of a monohydroxyalkyl group, a polyhydroxyalkyl group, a hydroxycycloalkyl group, an alkoxyalkyl group, and a hydroxyalkoxyalkyl group, and Z represents a halogen.

8. Material made of or containing an organic derivative of cellulose colored with a dye selected from the class of azo compounds having the general formula:

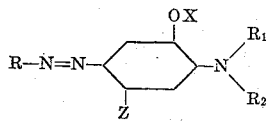

wherein R represents a member selected from the group consisting of a benzene nucleus, a naphthalene nucleus, an azobenzene nucleus, a benzothiazole nucleus, and a benzoxazole nucleus, $R_1$ and $R_2$ each represent a member selected from the group consisting of an alkyl group, a hydroxyalkyl group, a polyhydroxyalkyl group, an alkoxyalkyl group, an acyloxyalkyl group, a sulfatoalkyl group, and a sulfoalkyl group, and in addition $R_1$ may be hydrogen, X represents a member selected from the group consisting of a monohydroxyalkyl group, a polyhydroxyalkyl group, a hydroxycycloalkyl group, an alkoxyalkyl group, and a hydroxyalkoxyalkyl group, and Z represents a member selected from the group consisting of halogen, and an alkyl group.

9. Material made of or containing cellulose acetate colored with a dye selected from the class of azo compounds having the general formula:

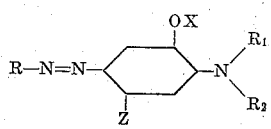

wherein R represents a benzene nucleus, $R_1$ and $R_2$ each represent a member selected from the group consisting of an alkyl group, a hydroxyalkyl group, a polyhydroxyalkyl group, an alkoxyalkyl group, an acyloxyalkyl group, a sulfatoalkyl group, and a sulfoalkyl group, and in addition $R_1$ may be hydrogen, X represents a member selected from the group consisting of a monohydroxyalkyl group, a polyhydroxyalkyl group, a hydroxycycloalkyl group, an alkoxyalkyl group, and a hydroxyalkoxyalkyl group, and Z represents a halogen.

JOSEPH B. DICKEY.